US010503365B2

(12) United States Patent
Rommel et al.

(10) Patent No.: US 10,503,365 B2
(45) Date of Patent: Dec. 10, 2019

(54) DEEP HIERARCHY NAVIGATION

(71) Applicant: SAP SE, Walldorf (DE)

(72) Inventors: Roman Rommel, Neustadt an der Weinstrasse (DE); Daniel Wurst, Karlsruhe (DE)

(73) Assignee: SAP SE, Walldorf (DE)

( * ) Notice: Subject to any disclaimer, the term of this patent is extended or adjusted under 35 U.S.C. 154(b) by 66 days.

(21) Appl. No.: 15/865,961

(22) Filed: Jan. 9, 2018

(65) Prior Publication Data

US 2019/0212881 A1 Jul. 11, 2019

(51) Int. Cl.
*G06F 3/0482* (2013.01)
*G06F 9/451* (2018.01)
*G06F 16/904* (2019.01)

(52) U.S. Cl.
CPC ............ *G06F 3/0482* (2013.01); *G06F 9/451* (2018.02); *G06F 16/904* (2019.01)

(58) Field of Classification Search
CPC .................................................... G06F 3/0482
USPC ........................................................ 715/854
See application file for complete search history.

(56) References Cited

U.S. PATENT DOCUMENTS

| 7,370,244 | B2 | 5/2008 | Breitling et al. |
| 8,732,668 | B2 | 5/2014 | Klemenz et al. |
| 8,949,678 | B2 | 2/2015 | Brunswig et al. |
| 9,075,786 | B2 | 7/2015 | Geithner |
| 9,195,936 | B1* | 11/2015 | Chase ................. G06F 8/65 |
| 9,424,167 | B2* | 8/2016 | Lee ................ G06F 11/3664 |
| 9,442,832 | B2 | 9/2016 | Bharara |
| 9,491,131 | B1* | 11/2016 | Herrick ................. H04L 51/24 |
| 2015/0339213 | A1* | 11/2015 | Lee ................ G06F 11/3664 |
| | | | 717/125 |
| 2017/0124053 | A1* | 5/2017 | Campbell .......... G06F 3/04847 |
| 2017/0185868 | A1 | 6/2017 | Wang et al. |
| 2017/0322716 | A1* | 11/2017 | Khoyi .................. G06F 8/35 |
| 2017/0329499 | A1 | 11/2017 | Rauschenbach et al. |
| 2017/0329580 | A1 | 11/2017 | Jann et al. |

* cited by examiner

*Primary Examiner* — William D Titcomb
(74) *Attorney, Agent, or Firm* — Fish & Richardson P.C.

(57) ABSTRACT

Systems and techniques for deep hierarchy navigation include instantiating user interface (UI) components of an application in an application view on a computing device, where each of the UI components is represented by an application (app) model. For each of the UI components, dependencies on other objects are mapped including paths to the other objects. In response to an action to submit data contained in the UI components, each of the UI components is checked against validation rules. In response to one of the UI components violating one of the validation rules, an error in the UI component violating the rule is identified in a popover window using the mapped dependencies to identify the error. In response to a selection of the error in the popover window, the application is focused on the UI component containing the error.

15 Claims, 11 Drawing Sheets

```
"routes" : [
  {
    "pattern": "gef-trips",
    "name": "geg-trips",
    "target": "gef-trips",
    "appName": "Travel Expense",
    "serviceUri": [
      "http://localhost:3000/api/v1.0/trips"
    ],
    "subroutes": [
      {
        "pattern": "gef-trips/{tripId}:?query:",
        "name": "gef-tripDetails",
        "target": "gef-tripDetails",
        "appName": "Travel Details",
        "serviceUri": [
          "http://api.service:3000/v1.0/trips/{tripid}"
        ]
      },
```

FIG. 7

```
31  router.get('/:productId', (req, res, next) => {
32      let productId = req.params.productId;
33      let baseUrl = req.protocol + '://' + req.get("host")+req.originalUrl;
34      products.getById(productId)
35          .then((oData) => {
36              res.json({
37                  data:oData;
38                  relations: {
39                      "bom": '${baseUrl}/billOfMaterials',
40                      "storage": '${baseUrl}/storage',
41                      "productions": '${baseUrl}/prodctions',
42                      "purchaseOrders": '${baseUrl}/purchaseOrders',
43                      "vendors": '${baseUrl}/vendors',
44                      "transactions": '${baseUrl}/transactions',
45                      "assembly": '${baseUrl}/assebly'
46                  },
47                  Message: oData.Length === 0
48                      ? "Product not found"
49                      : "Product was found"
50              });
51          })
52          .catch((e) => {
53              res.status(500).json({
54                  data:[],
55                  message: "Enter while fetching the data. "+ e
56              })
57          })
58  });
```

FIG. 8

```
{
  "id": 12346,
  "price": 0,
  "name": "Apple",
  "categoryId": 1234,
  "errors": [
    {
      "code": 1235,
      "domain": "price",
      "message": "Price should not be 0"
    }
  ],
  dependencies: [
    {
      "ref": "self",
      "serviceUrl": "https://services/product/12346"
    },
    {
      "ref": "category",
      "serviceUrl": "https://services/category/1234"
    }
  ]
}
```

FIG. 9

```
 4   // Mangoose Schema definition
 5   let productSchema= Schema ({
 6       name: {type: string, required: false},
 7       price: {type: Number, required: false},
 8       isAvailable: Boolean,
 9       categoryId: {
10           Type: Schema.types.ObjectId,
11           ref: 'Category',
12           required:false
13       },
14       modifiedOn: {type:Date},
15       createdAt: {type: Date, required: true}
16   });
17
18   /**
19    * Validation rules for a product
20    *
21    * @param {function} next-callback
22    * @param {Object} data-data which is getting validated
23    */
24   let productValidation = function (next, data) {
25       let nameError = validateName (data.name);
26       let priceError = validatePrice(data.price);
27       let categoryError = validateCategory(data.categoryId);
28       if (nameError || priceError || categoryError) {
29           data['errors'] = [];
30           if (nameError) data['errors'].push(nameError);
31           if (priceError) data['errors'].push(priceError);
32           if (categoryError) data['errors'].push(categoryError);
33       }
34       next();
35   };
36
37   function validateName(sName) {
38       let errorMessage =
39           !sName || sName ===""? "Product name was not defined":
40               sName.length <=3? "Product name is to short" : undefined:
41       return errorMessage ? {domain: "name", message: errorMessage, valid: false}:null;
42   }
43
44   function validatePrice(nPrice) {
45       retrun nPrice === 0 ? {domain: "price", message: "Price is to low. Must be greater than 0"} : null:
46   }
47
48   function validateCategory(nId) {
49       return !nId? {domain: "categoryId", message: "Product has no category assigned"} : null:
50   }
```

DEEP HIERARCHY NAVIGATION

TECHNICAL FIELD

This description relates to systems and techniques that improve computer technology in identifying and navigating to errors in computer applications.

BACKGROUND

Many computer applications, especially computer applications designed to run and operate on the Internet (or the World Wide Web), use forms. For example, the forms may include registration forms, screens to create new product, purchase forms, invoice forms, and many different types of forms. The forms may have lots of different uses and be used by many different types of users, including developers, designers, end users, consumers, etc. The forms may include different fields. Objects may be used to create forms and fields within the forms. An object may be a stand-alone object meaning that the object is not linked to or does not reference other objects. The object may be a linked object meaning that the object is linked to or does reference at least one other object.

An object used to create a form or a field in a form may contain an error. In some instances, the object is a linked object and the error may be in an object that is referenced by or linked to the linked object. One technique to identify errors in forms and fields, including during completion of the fields for submission to be saved and stored, is to perform an in-place validation of the form fields. For example, an application may not allow a user to save and submit a form if a mandatory field is not completed or if one of the fields contains an error, even when the error is in the object linked to the field. An in-place validation may scan the fields and objects directly linked to the field for these and other errors and prevent the form from being submitted until the error is resolved. The in-place validation may identify the field that contains the error such that it is identified to a user. However, the in-place validation may not identify all possible errors in the form fields, for example, when one field depends on the input of another field or when the error is present in an object that is linked to or referenced by the object linked to the field. In these cases, it is not possible to bring the application focus to such a field that contains one of these types of errors and the underlying error may be difficult to find. For both users creating forms and users completing forms, this deficiency of current in-place validation techniques on fields and the objects underlying the fields results in lost productivity and inefficiencies when interacting with these applications.

Further technical problems may arise when objects from one application reference objects of another application and errors are present in the referenced application. The errors present in the objects of the referenced application may not be traceable and detectable from the application in use using current systems and techniques.

SUMMARY

According to one general aspect, systems, techniques and computer program products for deep hierarchy navigation include instantiating user interface (UI) components of an application in an application view on a computing device, where each of the UI components is represented by an application (app) model. For each of the UI components, dependencies on other objects are mapped including paths to the other objects. In response to an action to submit data contained in the UI components, each of the UI components is checked against validation rules. In response to one of the UI components violating one of the validation rules, an error in the UI component violating the rule is identified in a popover window using the mapped dependencies to identify the error. In response to a selection of the error in the popover window, the application is focused on the UI component containing the error.

Implementations include one or more of the following features. For example, mapping the dependencies may include defining a structure of relations to the UI components using reference information contained in a database layer. Focusing the application on the UI component containing the error may include highlighting a field containing the error. At least one of the other objects is for an UI component in a different application. In response to the selection of the error in the popover window, the different application is displayed and the UI component in the different application is focused. The computer-implemented method further includes receiving a new input in the UI component containing the error, checking the UI component against the validation rules and in response to passing the validation rules, removing the error from the popover window.

The details of one or more implementations are set forth in the accompanying drawings and the description below. Other features will be apparent from the description and drawings, and from the claims.

BRIEF DESCRIPTION OF THE DRAWINGS

FIG. 10 is example pseudocode of validation middleware using Mongoose.

DETAILED DESCRIPTION

This document describes systems and techniques for a deep hierarchy navigation that automatically identify errors of an application, where the errors are contained in the application or objects of the application and/or the errors are contained in a referenced application or objects of the referenced application. In addition to identifying the errors, the errors are summarized and the system and techniques enable easy navigation to the application and object containing the error. In this manner, the systems and techniques described in this document provide a technical solution to improve computer-related technology by automatically identifying and navigating to errors in applications and underlying objects of the application, especially for errors that are not visible or otherwise readily apparent and may reside within related applications and objects. This eliminates a need to search the application and other applications to find the error. This improves the functioning of the computer by identifying and bringing into focus errors in applications.

Figure 1:
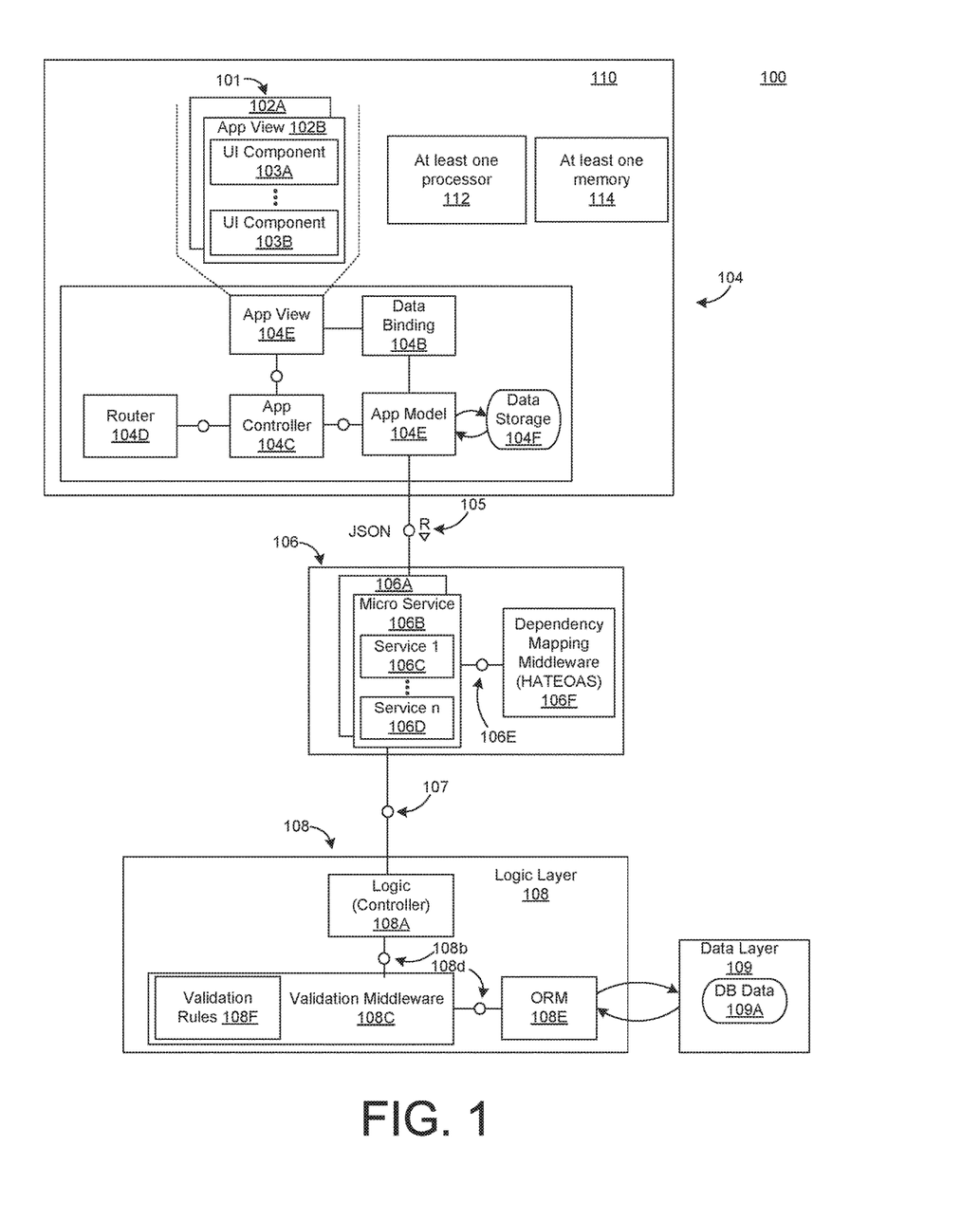
FIG. 1 is a block diagram of a system for deep hierarchy navigation for identifying and navigating to errors.

FIG. 1 is a block diagram of a system 100 for deep hierarchy navigation for identifying and navigating to errors. The system 100 describes a system architecture that includes four (4) component layers using a service oriented architecture approach. The system 100 includes a front end layer 104, a service layer 106, a logic layer 108 and a database layer 109. Using this multi-tier architecture, specifically a four tier architecture, enables decoupling of the individual components, which is discussed in more detail below. The frontend layer 104 may be implemented on a computing device 110, where the computing device may include a laptop, a notebook, a desktop, a smartphone, a tablet or any other type of computing device. The computing device 110 includes at least one processor 112 and at least one memory 114. The at least one processor 112 may represent two or more processors on the computing device 110 executing in parallel and utilizing corresponding instructions stored using the at least one memory 114. The at least one memory 114 represents a non-transitory computer-readable storage medium. Of course, similarly, the at least one memory 114 may represent one or more different types of memory utilized by the computing device 110. In addition to storing instructions, which allow the at least one processor 112 to implement the application 108 and its various components, the at least one memory 104 may be used to store data, such as one or more of the objects generated by an application and its components such as the application (app) view 102a and 102b components and the respective UI components 103a and 103b.

Each of the other tiers, the service layer 106, the logic layer 108 and the database layer 109 may be easily scaled, maintained and migrated, which is especially advantageous for implementations using a cloud network. That is, these layers may be on a single computing device, such as a server having at least one processor and at least one memory, or these layers may be distributed across multiple computing devices, such as multiple servers each having at least one processor and at least one memory. While the computing devices and corresponding components for these tiers are not illustrated in FIG. 1, it is understood that these layers can reside on such computing devices and be interconnected and communicate over a network, including a cloud network.

As illustrated in FIG. 1, in some implementations, the frontend layer 104 relates to web application deployments. In the example of FIG. 1, the frontend layer 104 is implemented using SAPUI5 framework. It is understood that the frontend layer 104 may be implemented using other frameworks including, but not limited to other platforms such as e.g. native mobile apps, desktop apps, etc. Because the frontend layer 104 may be implemented on different platforms, the service layer 106 may provide the data from the service layer 106 to the frontend layer 104 in a commonly used format like JSON 105, as described below. It is understood that the request type is not limited to JSON 105 and may be changed by the application deployment, e.g. XML for native Android applications. It is possible to retrieve the data in XML format using the OData-Protocol, a commonly used protocol for enterprise applications. For the purposes of explanation, this document uses SAPUI5 Framework and a Model-View-Control design pattern as may be used in other JavaScript-Frameworks (e.g. Angular), Android or iOS applications.

The frontend layer 104 includes app view 104a, data binding 104b, app controller 104c, router 104d, app model 104e and data storage 104f. The app view 104a is displayed on a computing device as app view 102a and 102b. Each of the app views 102a and 102b may be populated with multiple different user interface (UI) components. For instance, app view 102b includes UI components 103a and 103b. While only two UI components are illustrated, it is understood that each app view, such as app view 102a and 102b, may display more than two UI components.

Figure 2:
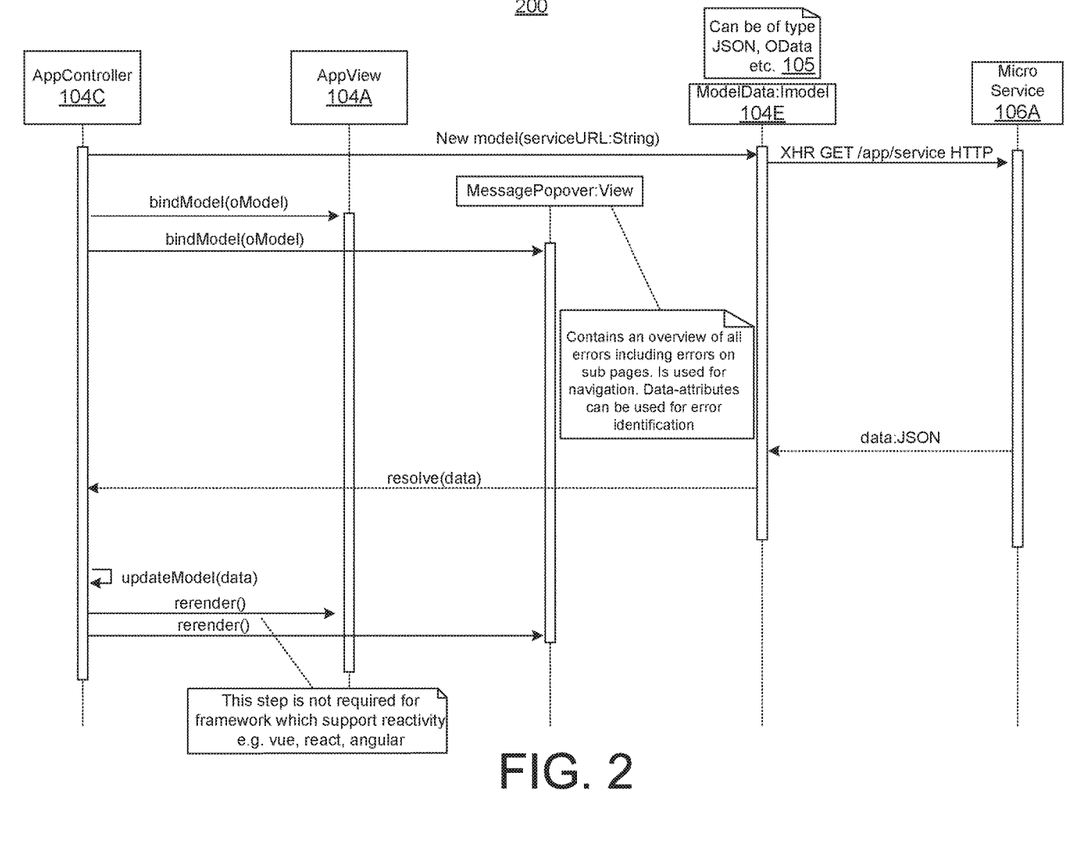
FIG. 2 is a sequence diagram of an example process for frontend initialization.

Referring also to FIG. 2, an example sequence diagram 200 illustrates the frontend layer 104 initialization process. In the first step, a model is bound to the view even before the data is fetched because the data is fetched asynchronously. Specifically, the app controller 104c binds a model (bindModel(oModel)) to the app view 104a. After the data is fetched from the data layer 109 through the service layer 106 and the logic layer 108, the model is updated. In the last step, the view is rendered. The rendering is not required in case other frameworks have reactive binding and update automatically as soon as the model changes.

Figure 4:
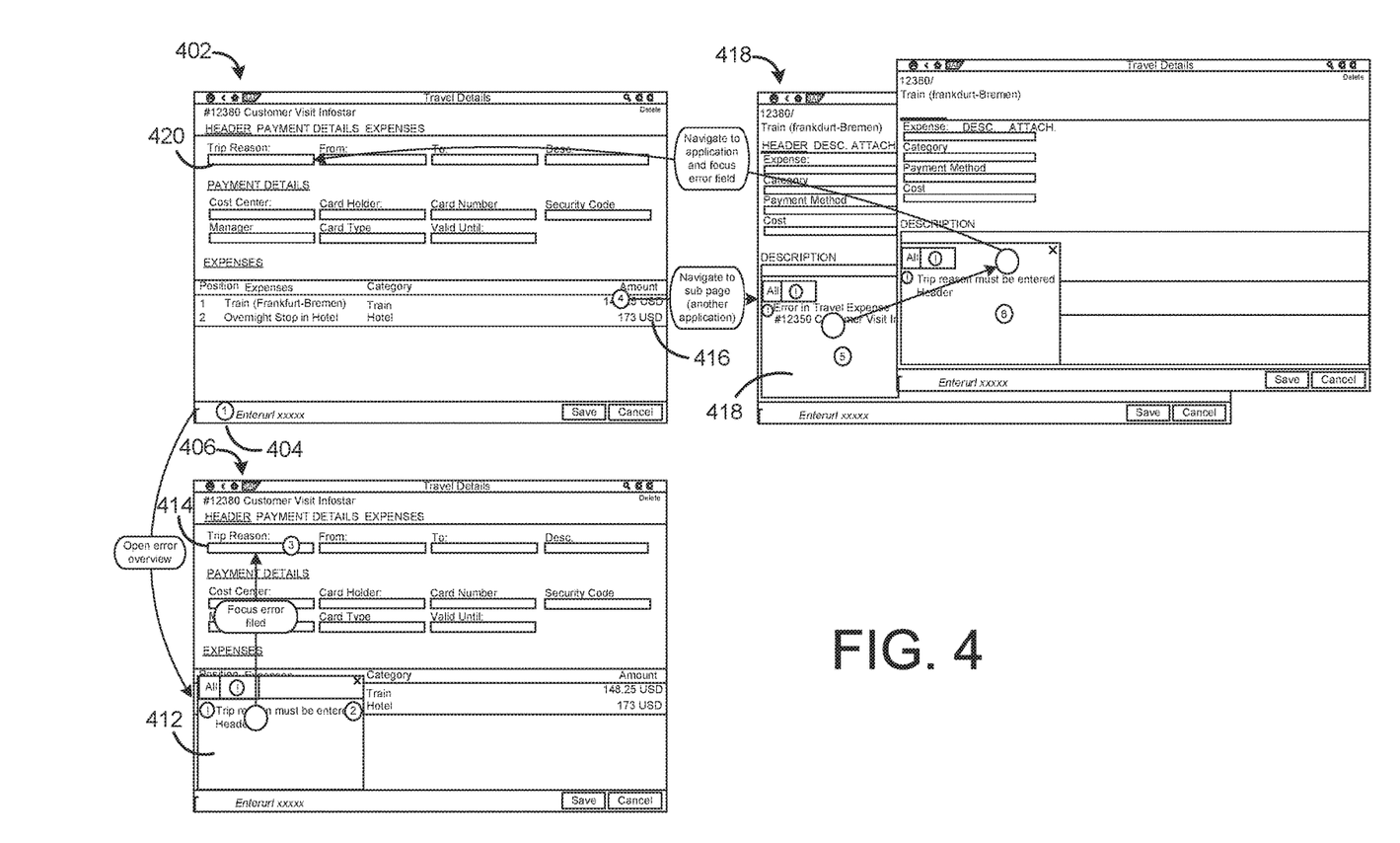
FIG. 4 is an example of several screen shots of user interfaces for identification of errors in both a current application and a referenced application.

After all assets have been loaded (JS files, XML Views etc.) a few lifecycle methods are triggered which are used as hooks for application development from the app controller 104c. In this particular example, the onInit( ) method is used to fetch the data from a web service (SOAP, REST or OData) by instantiating a model. It may also be possible to fetch the data via a XMLHttpRequest or the fetch-API supported by the most modern browsers. After the data for the currently visible object has been fetched, additional requests are made to fetch data from resources which are related with this object (the structure is shown in FIG. 4 and will be described in detail below). The app controller 104c requests a new Model from the modelData I Model 104e.

Figure 3:
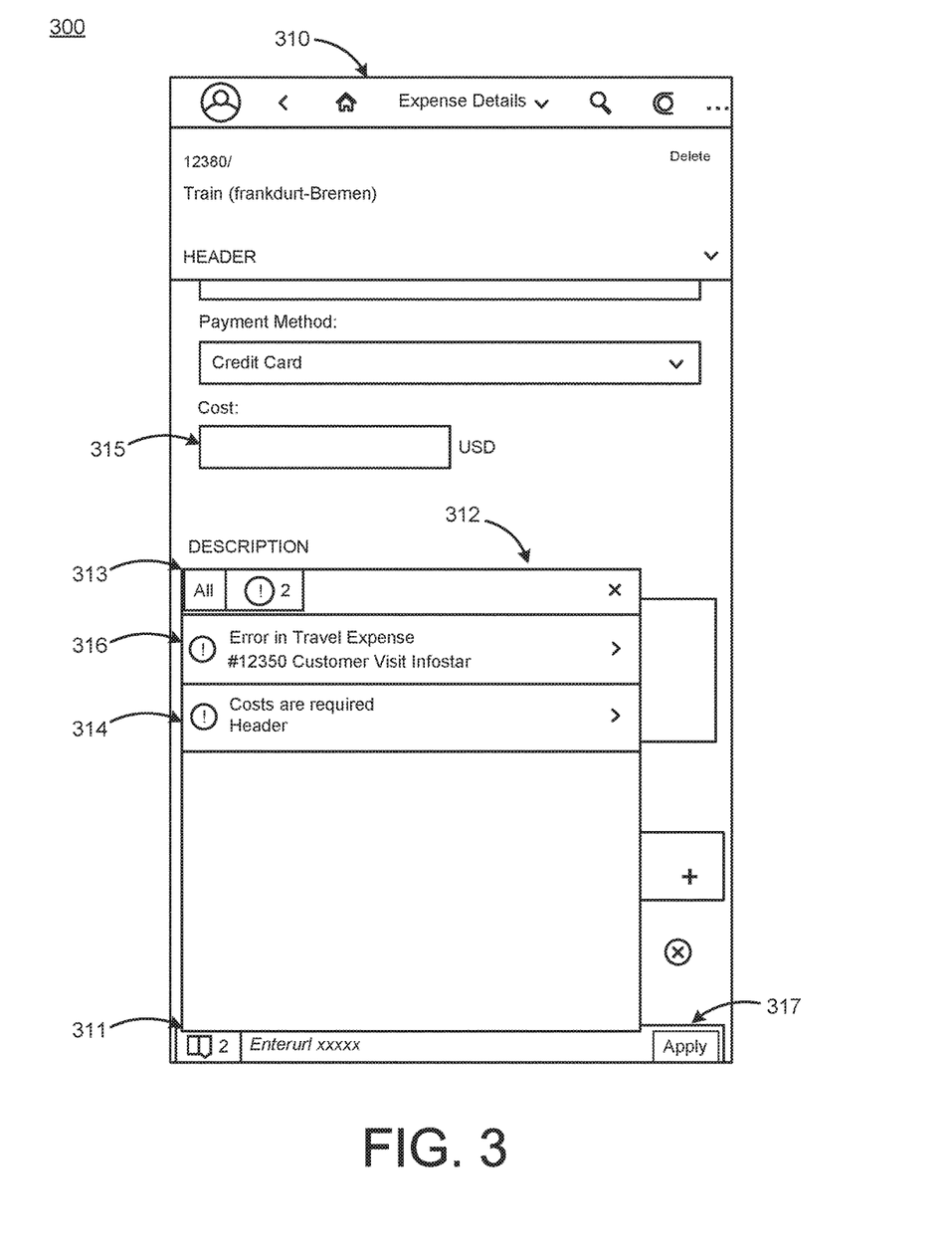
FIG. 3 is an example implementation of a user interface (UI).

In parallel, the DOM is rendered consisting of different kinds or types of UI components (103a-103b) e.g. input fields, dropdown selection menus, etc. The UI components 103a-103b are also bound to the data model which is asynchronously fetched. Referring also to FIG. 3, in an embodiment, the application may also contain a UI Component, for example as shown in FIG. 3 such as a popup list 312, which is used to summarize all errors. As shown in FIG. 1, the message popover 312, is a sub view (101) from the main view (104a).

FIG. 3 includes an example representation of UI 300 to illustrate some aspects herein. UI 310 relates to an expense detail application screen in a portrait view on a small screen, for example on a smartphone device. Button 311 is displayed when error messages related to the expense form exist. In an embodiment, button 311 may display the number of error messages within as shown as 2 messages coupled with an error icon. When invoked (selected) button 311 displays popup 312. As shown, popup 312 contains header 313 showing both an indication that "all" errors messages are displayed and the number of messages are 2 as indicated, similar to button 311. In an embodiment, popup 312 contains selectable listed items 314 and 316. In an embodiment, list item error message 314 "costs are required" may be further represented by a highlighted text box form field 315. The popup 312 includes a summary of errors, which in this case are listed items 314 and 316. In an embodiment, the error field highlight may be red, or another color, to draw the user's attention to the error problem as an affordance to cause the user to enter the cost amount in the field. In an embodiment, after entering a cost amount, then invoking the apply button 317, the list item 314 may be removed from the list indicating that the error problem has been resolved. In an embodiment, popup 312 list item 316 may be located on a different page and form (not shown). Selecting list item 316 may cause display of that form and the associated form field. In an embodiment, the form related to list item 316 may be associated with an entirely different application as is further described herein in FIG. 4.

Referring to FIG. 4, a first UI 402 illustrates a travel details application containing multiple fields. The fields are designed for a user to complete and submit as part of a travel details to track payment details and expenses during the travel. On the UI 402, an error indicator 404 is highlighted indicated that there is an error on the form. Selecting the error indicator 404 results in the UI 406, which is the same as UI 402, except the UI 406 now includes the popup 412. The popup 412 includes a list of errors contained in the application, which in this case the field trip reason 414 is a mandatory field that needs to be completed. Selection of the error in the popup 412 brings the field 414 into focus.

When the expense amount 416 is selected, another application UI 418 is opened. The UI 418 is for expense details. The expense details UI 418 also includes a popover 418. The popover 418 indicates that there is an error in the other application, namely, the travel details UI 402 and 406. When the error listed in the popover 418 is selected, it automatically navigates to the UI 402 and the highlighted error field 420, which is the same field that was highlighted from the popover 412. This illustrates that when the user is in the UI 418, it is possible to automatically identify and navigate to errors in a different application UI.

Figure 5:
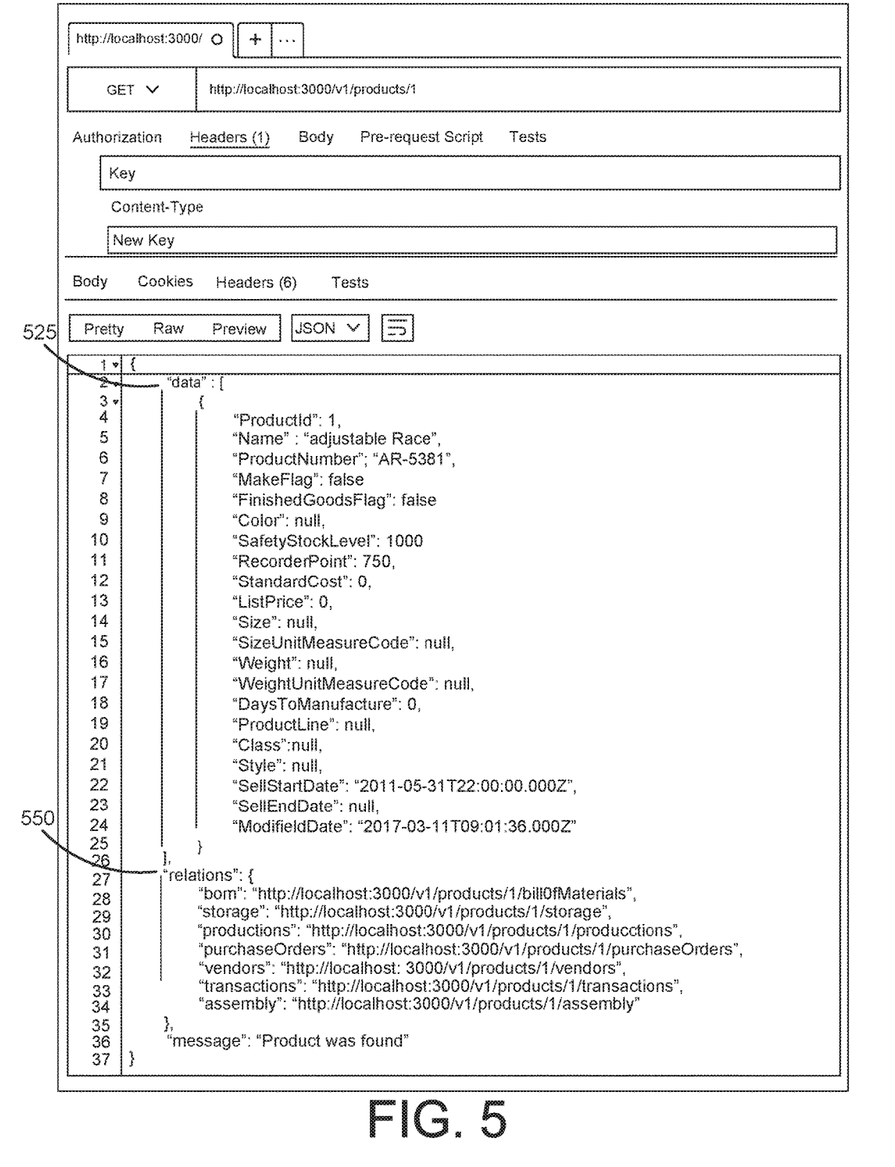
FIG. 5 is example pseudocode for retrieving referenced objects and for relational mapping.

Referring back to FIG. 1, the service layer 106 is used for decoupling the front from the logic 108 in the backend. The service layer 106 may be implemented using different approaches, for example REST, SOAP, OData etc. The service resources 106a-106d may be accessible using the HTTP protocol through an URI. Deep Hierarchy Navigation requires an addition to the common service data retrieval because of errors on referenced applications. This functionality may be achieved by using HATEOAS (Hypermedia As The Engine Of Application State) in the dependency mapping middleware 106f. HATEOAS is in architecture style to retrieve the object data, but also all referenced objects for quick access and also for the relation mapping directly from the REST Service. The dependency mapping middleware 106f maps one object and all other objects referenced by the one object to enable the identification of errors contained not only in the one object but also in all referenced objects. The information for referenced objects may be obtained from the data layer 109 and the database data 109a, which contains keys to reference tables for the referenced objects. An example pseudocode is shown in FIG. 5 where we can see a response for the route http://localhost:3000/v1/products/1. The JSON document contains the object data 525 but may also contain relations 550 to the bill of materials, storage, productions, purchaseOrders, vendors, transactions and assembly. These resources may be used to fetch all errors from related objects (this is done asynchronously after the UI has been loaded). In this manner, it is possible to detect (or identify) not only the errors in the one object containing the data 525, but also to detect (or identify) errors from all relations 550, i.e., all related objects, where the related objects may not be visible when the one object is instantiated and the data is populated.

The service layer 106 on its own contains no logic e.g. validation rules and can be decoupled entirely from the logic layer communication through a protocol 107 e.g. TCP, Web Sockets, HTTP. It is understood that it is possible to use other approaches e.g. inclusion of a library as DLL.

As shown in FIG. 1, the logic layer 108 may also contain logic 108a for database communication. The communication with the database may be done through an ORM 108e (Object Relational Mapping) e.g. Hibernate, Linq or, as in this example, Mongoose. The ORM 108e is used as a Façade for easier communication with the database 109. In an embodiment, the ORM 108e may allow retrieval of data 109a from different databases by using the same query. In an embodiment, the ORM (ODM in the example of Mongoose) also contains a part which enables the deep hierarchy navigation, the validation middleware 108c. The validation middleware 108c contains hooks which can be used before and after the data 109a has been retrieved from the database data layer 109. Within those hooks it is possible to implement validation rules which can be retrieved by the service layer 106. A code example is shown in the implementation section below. The data layer 109 may contain any kind of storage (even file system) may be used to store and retrieve the data 109a.

The SAP UI5 Framework has several life cycle hooks which can be used during application initialization, as discussed above with respect to FIG. 2 sequence diagram.

TABLE 1

| Method | Functionality |
| --- | --- |
| onInit | Method is called when the object has been created directly in the constructor. This method is always called only once |
| onBeforeRendering | Method is called before the UI component is rendered. Method can be called multiple times by calling the [Object].rerender( ) |
| onAfterRendering | Method is called after the UI component has been injected into the DOM. Method is called multiple times by calling [Object].rerender( ) |

For deep hierarchy navigation, the onInit method is used, which triggers the data fetching 105 from a micro service 106a-106d before an UI Component has been rendered. Within the App View 101, all UI components 103a-103b are defined, including the mapping (binding) for errors by using custom data attributes. The same data binding is also used for error items inside the message popover illustrated in FIG. 3.

To bind the errors on the UI, a custom attribute is used, which is supported by all major browsers: http://caniuse.com/#search=dataset

| Psuedo Code 1 |
| --- |
| <Input text="{model>value}"<br>data:errorfield="{model>errorDomain}"<br>data:errormessage="{model>errorMessage}" /> |

JavaScript is then used to focus the error field with the appropriate data attribute when an error items 110, 111 has been selected in the message popover illustrated in FIG. 3.

Figure 7:
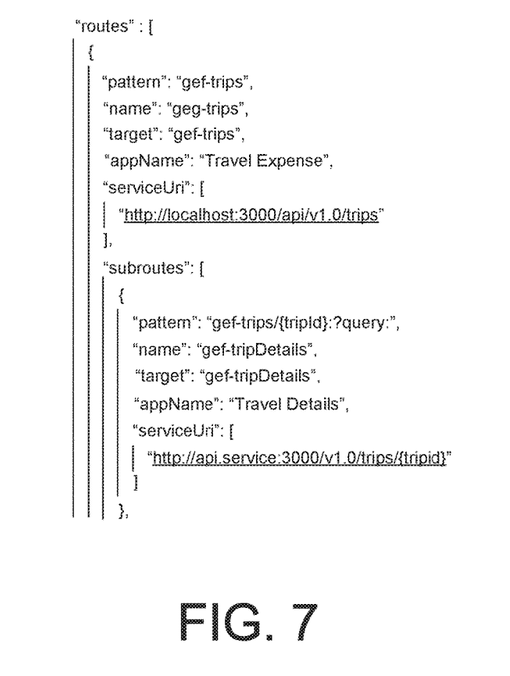
FIG. 7 is example pseudocode for navigating to errors within a current application.

With this approach described above, all applications are decoupled from each other, all errors and dependencies are provided by a micro-service 106a-106d. What still has to be done is the navigation target to the application where dependent errors are visible, in this case a reference to an application where the related error is shown may be used in FIG. 7. In other cases where a different framework is used, the navigation can be triggered, but without focusing the error field. To do so, an intent based is used.

Figure 6:
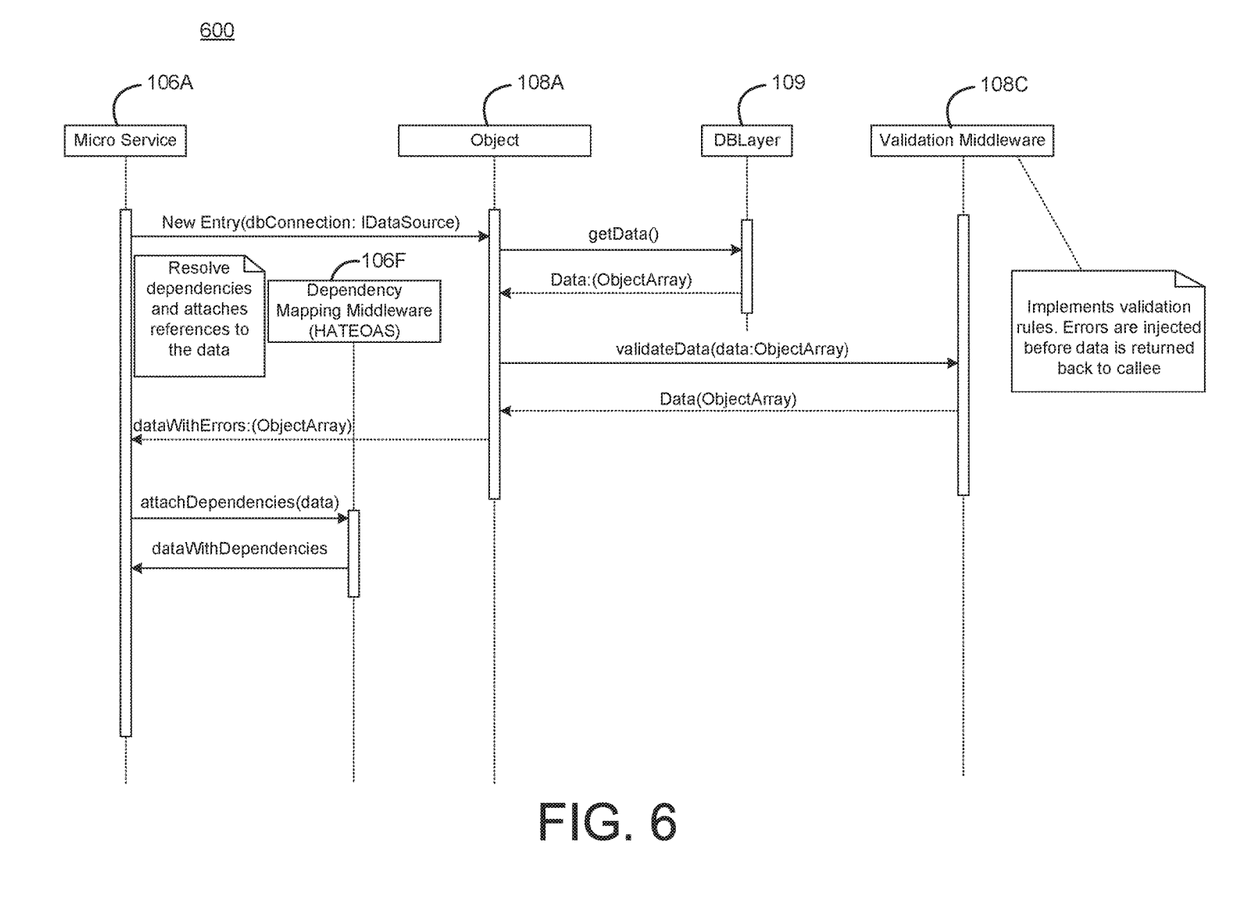
FIG. 6 is a sequence diagram of an example process for communication between the service layer, the business layer and the database layer.

When an error item is present within the Message Popover FIG. 3 an DOM lookup is triggered by using the data-attribute. This field is focused afterwards.

document.querySelector("[data-errorfield=price]").focus( );

When the navigation target is not visible at the current page, then navigation is triggered. For SAP UI5 Application the router 104d provided by UI5 could be used e.g. The navigation target can be found inside the manifest.json (app descriptor) which can be parsed using regular expressions. An example is shown in FIG. 6, which is a sequence diagram 600 that illustrates communications between the service layer, the business layer and the data layer. The micro service 106a instantiates an object 108a. The object 108a contains methods for fetching data from the database layer 109. The data is then validated inside the logic layer 108 by the validation middleware 108c using one or more validation rules 108f. The micro service 106a then defines the structure of the response, an example of which is illustrated in the pseudocode of FIG. 5. Also referring to FIG. 7, an example of the manifest file containing the serviceUri is illustrated. The dependency which contains errors matches with the route defined in the manifest, e.g., http://api.service/3000/v1 that corresponds to the errors illustrated in the popover window 312 of FIG. 3.

The crossNavigation object provides properties for intent based navigation where the viewUrl to a dependency view can be found, other approaches are also possible. When the user has selected an error which is located on a subpage 316, then the event bus is used to publish the error message to the recipient.

```
App 1 (source):
let oEventBus = sap.ui.getCore( ).getEventBus( );
oEventBus.publish("Source", "FocusError", { errorField: "name" });
App 2 (target):
let oEventBus = sap.ui.getCore( ).getEventBus( );
oEventBus.subscribe("Source", "FocusError", this.focusError, this);
```

The target application can then use promises (Promise.all([ ])) to make sure that the data has been loaded and also has been bound before the focus function is triggered.

Figure 8:
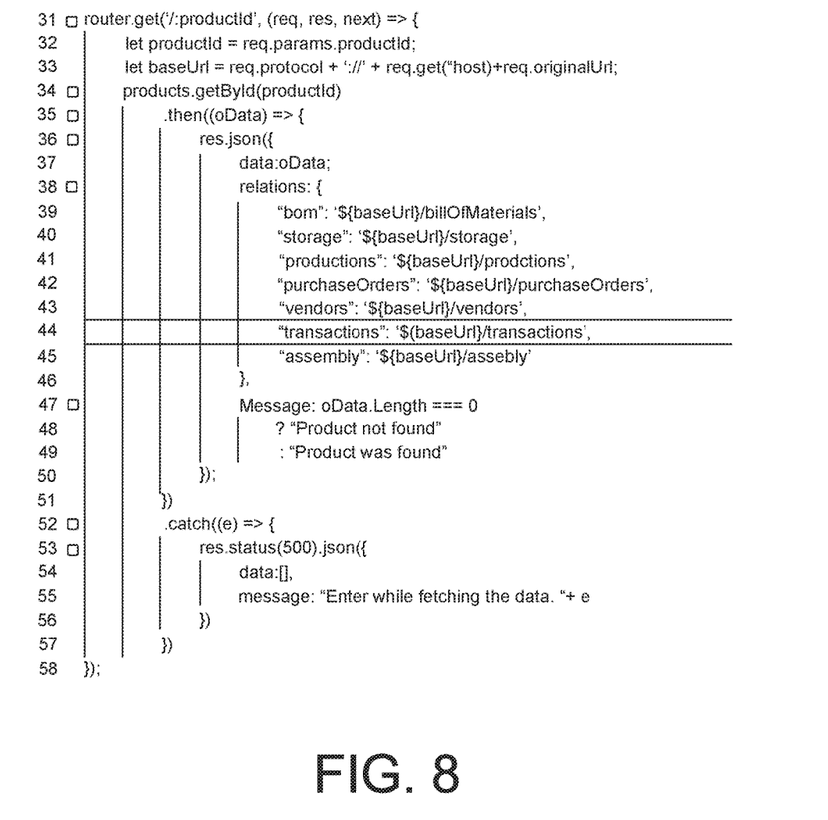
FIG. 8 is example pseudocode of a REST route using the HATEOAS architecture style.

The service layer is used to send the requested data to the user during the initiation phase. The first request which is made by the users leads to the source which is used for the model initialisation. The request is then processed in the backend followed by a response with the requested data. All relations with this object are also defined inside the service layer, which than can be used for the Deep Hierarchy Navigation, as illustrated in the pseudocode of FIG. 8.

Figure 9:
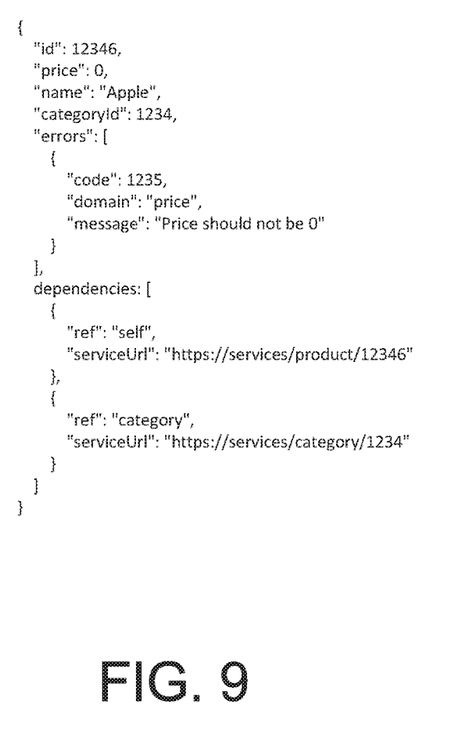
FIG. 9 is example pseudocode of a HATEOAS URI with dependencies.

Using HATEOS it is possible to add additional information about the resource route to the REST Endpoint of the parent. The service URL may be used in the frontend to lazy load the errors from the parent page (after a page is loaded, errors from referenced pages are fetched asynchronously). FIG. 9 illustrates pseudocode for an example structure.

Before the data is provided to the user a middleware is used, which "injects" all. FIG. 10 illustrates example pseudocode showing how Mongoose schemas can be used to solve this problem.

Figure 11:
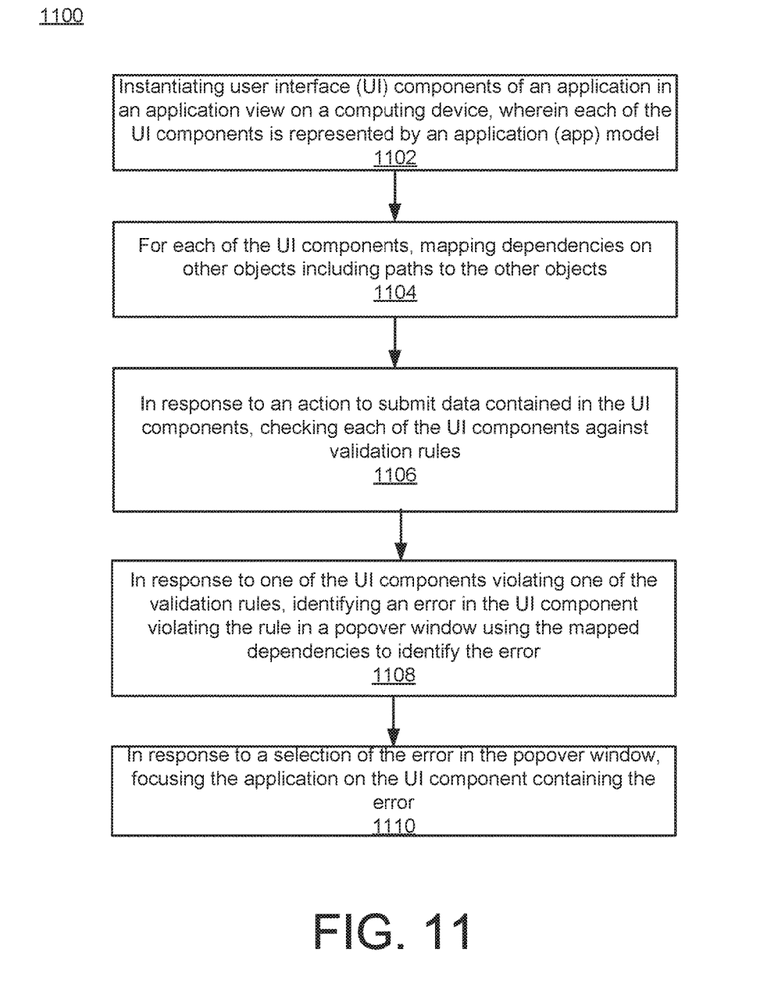
FIG. 11 is an example flowchart of a process 1100 implementing the system 100 of FIG. 1.

FIG. 11 is an example flowchart of a process 1100 implementing the system 100 of FIG. 1. Process 1100 includes instantiating user interface (UI) components of an application in an application view on a computing device, where each of the UI components is represented by an application (app) model (1102). For example, the application controller 104c of FIG. 1 is configured to instantiate instantiating user interface (UI) components 103A, 103B of an application in an application view 102A, 102B on a computing device, where each of the UI components is represented by an application (app) model.

Process 1100 includes, for each of the UI components, mapping dependencies on other objects including paths to the other objects (1104). For example, the dependency mapping module 106F of FIG. 1 is configured, for each of the UI components, to map dependencies on other objects including paths to the other objects.

Process 1100 includes, in response to an action to submit data contained in the UI components, checking each of the UI components against validation rules (1106). For example, the validation middleware module 108C of FIG. 1 is configured, in response to an action to submit data contained in the UI components, to check each of the UI components against validation rules.

Process 1100 includes, in response to one of the UI components violating one of the validation rules, identifying an error in the UI component violating the rule in a popover window using the mapped dependencies to identify the error (1108). For example, the validation middleware module 108C is configured, in response to one of the UI components violating one of the validation rules, to identify an error in the UI component violating the rule in a popover window using the mapped dependencies to identify the error.

Process 1100 includes, in response to a selection of the error in the popover window, focusing the application on the UI component containing the error (1110). For example, the application controller 104C is configured, in response to a selection of the error in the popover window, to focus the application on the UI component containing the error.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method comprising:
    instantiating user interface (UI) components of an application, wherein the UI components are associated with a plurality of application views of the application on a computing device, wherein each of the UI components is represented by an application model, and wherein the one or more application views are populated with different UI components from the UI components;
    defining a mapping structure including relationships between for the UI components, wherein a relationship is determined based on a dependency of an object included in a UI components to another object included in another UI component, wherein the relationships include at least one relationship between two objects from two different UI components associated with two different application views from the plurality of application views of the application;
    in response to receiving data for an object in a first UI component in a first application view from the plurality of application views of the application, validating the received data with validation rules associated with the first UI component;
    in response to the first UI component violating one of the validation rules, identifying an error in a second UI component, wherein the second UI component is determined based on the defined mappings, the second UI component being in a relationship with the first UI component, and wherein the second UI component is included in a second application view different from the first application view from the plurality of application views of the application;
    providing a popover window at the first application view to include a notification associated with the identified error; and
    in response to a selection of the notification in the popover window, automatically navigating to the second application view including one or more objects of the second UI component associated with the error.

2. The computer-implemented method of claim 1, wherein the mapping structure defines relations to the UI components using reference information contained in a database layer.

3. The computer-implemented method of claim 1, wherein navigating to the second application view of second the UI component comprises providing a notification identifying the error by highlighting a field containing the error.

4. The computer-implemented method of claim 1, wherein at least one of the other objects is for an UI component in a different application.

5. The computer-implemented method of claim 4, further comprising displaying the second application view and displaying the second UI component on to include a highlighted field including the error.

6. A computer program product for deep hierarchy navigation, the computer program product being tangibly embodied on a non-transitory computer-readable storage medium and comprising instructions that, when executed by at least one computing device, are configured to cause the at least one computing device to:
    instantiate user interface (UI) components of an application, wherein the UI components are associated with a plurality of application views of the application on a computing device, wherein each of the UI components is represented by an application model, and wherein the one or more application views are populated with different UI components from the UI components;
    define a mapping structure including relationships between for the UI components, wherein a relationship is determined based on a dependency of an object included in a UI components to another object included in another UI component, wherein the relationships include at least one relationship between two objects from two different UI components associated with two different application views from the plurality of application views of the application;
    in response to receiving data for an object in a first UI component in a first application view from the plurality of application views of the application, validate the received data with validation rules associated with the first UI component;
    in response to PM the first UI component violating one of the validation rules, identify an error in a second UI component, wherein the second UI component is determined based on the defined mappings, the second UI component being in a relationship with the first UI component, and wherein the second UI component is included in a second application view different from the first application view from the plurality of application views of the application;

provide a popover window at the first application view to include a notification associated with the identified error; and in response to a selection of the notification in the popover window, automatically navigate to the second application view including one or more objects of the second UI component containing associated with the error.

7. The computer program product of claim 6, wherein instructions that, when executed by the at least one computing device, are configured to cause the at least one computing device to map the dependencies comprises instructions that, when executed by the at least one computing device, are configured to cause the at least one computing device to define the mapping structure defining relations to the UI components using reference information contained in a database layer.

8. The computer program product of claim 6, wherein instructions that, when executed by the at least one computing device, are configured to cause the at least one computing device to navigate to the second application view of second the UI component comprises providing a notification identifying the error by highlighting a field containing the error.

9. The computer program product of claim 6, wherein at least one of the other objects is for an UI component in a different application.

10. The computer program product of claim 9, wherein instructions that, when executed by the at least one computing device, are configured to cause the at least one computing device to display the second application and display the second UI component on to include a highlighted field including the error.

11. A system for deep hierarchy navigation, the system comprising:
at least one memory including instruction; and
at least one processor that is operably coupled to the at least one memory and that is arranged and configured to execute instructions that, when executed, cause the at least one processor to:
an application controller to instantiate user interface (UI) components of an application, wherein the UI components are associated with a plurality of application views of the application on a computing device, wherein each of the UI components is represented by an application model, and wherein the one or more application views are populated with different UI components from the UI components;

a dependency mapping module configured to define a mapping structure including relationships between for the UI components, wherein a relationship is determined based on a dependency of an object included in a UI components to another object included in another UI component, wherein the relationships include at least one relationship between two objects from two different UI components associated with two different application views from the plurality of application views of the application;

a validation middleware module that, in response to receiving data for an object in a first UI component in a first application view from the plurality of application views of the application, is configured to validate the received data with validation rules associated with the first UI component;

the validation middleware module that, in response to the first UI component violating one of the validation rules, is configured to
identify an error in a second UI component, wherein the second UI component is determined based on the defined mappings, the second UI component being in a relationship with the first UI component, and wherein the second UI component is included in a second application view different from the first application view from the plurality of application views of the application;
provide a popover window at the first application view to include a notification associated with the identified error; and the application controller, in response to a selection of the notification in the popover window, is configured to automatically navigate to the second application view including one or more objects of the second UI component associated with the error.

12. The system of claim 11, wherein the mapping structure defines relations to the UI components using reference information contained in a database layer.

13. The system of claim 11, wherein navigating to the second application view of second the UI component comprises providing a notification identifying the error by highlighting a field containing the error.

14. The system of claim 11, wherein at least one of the other objects is for an UI component in a different application.

15. The system of claim 14, wherein application controller is configured to display the second application view and displaying the second UI component on to include a highlighted field including the error.

* * * * *